Patented May 7, 1935

2,000,044

UNITED STATES PATENT OFFICE 2,000,044

ANTIOXIDANT

Arthur W. Sloan, Akron, Ohio, assignor to The B. F. Goodrich Company, New York, N. Y., a corporation of New York No Drawing. Application May 26, 1933, Serial No. 673,114

29 Claims. (Cl. 18—50)

This invention relates to the art of preserving rubber, fatty oils, petroleum products, synthetic plastics, and like organic materials against unduly rapid deterioration due to oxidation and the like.

This invention, in brief, consists in treating the rubber or other organic material with a member of a class of compounds which may be designated as amino-substituted poly-aryl carbinols, or specifically as amino substituted benzhydrols. They have the general structural formula

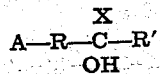

where A represents a primary, secondary, or tertiary amino group, R represents an aromatic nucleus, R' represents an aryl radical which may and preferably does contain an amino group, and X represents H or a hydrocarbon group.

For example, the following compounds are typical members of the class of anti-oxidants described above: p-amino diphenyl carbinol; p-phenylamino diphenyl carbinol; p-dimenthylamino diphenyl carbinol; p,p' diamino diphenyl carbinol; p, p'diamino o,o' ditolyl carbinol; di-amino dinaphthyl carbinol; p,p' diamino di-phenyl methyl carbinol; p,p' diamino tri-phenyl carbinol; p,p' di(methylamino) diphenyl carbinol; p,p' di(ethylamino) diphenyl carbinol; p,p' di(butylamino) diphenyl carbinol; p,p' di(benzylamino) diphenyl carbinol; p,p' di(phenylamino) diphenyl carbinol; p,p' di(p-tolylamino) diphenyl carbinol; p,p' di(naphthylamino) diphenyl carbinol; p,p' di(phenylamino) triphenyl carbinol; tetramethyl p,p' diamino di-phenyl carbinol; p,p' di(phenyl-ethylamino) diphenyl carbinol; tetramethyl p,p' diamino tri-phenyl carbinol; tetramethyl diamino dinaphthyl carbinol; p,p', p'' triamino triphenyl carbinol; and triphenyl triamino triphenyl carbinol; as well as the corresponding compounds containing the substituent group in the ortho, meta, or other positions. Any of the above enumerated compounds may be used with good effect to retard the deterioration of rubber or other like organic substances, preferably in moderately small proportions, say from 0.1 to 5 percent.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 parts. One portion of this composition is used as a control, while another portion is further mixed with 0.96 parts by weight (0.5% of the composition) of tetramethyl p,p' diamino diphenyl carbinol, commonly known as tetramethyl diamino benzhydrol. After vulcanization in a press for 45 minutes at 294° F. to produce an optimum cure, it is found that the composition containing the anti-oxidant deteriorates only approximately one-half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof as a paste, powder or solution. The term "rubber" is likewise employed in the claims in a generic sense to include caoutchouc, both natural and synthetic, balata, gutta percha, rubber isomers and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

This application is a continuation in part of my co-pending application Serial No. 301,423 filed August 22, 1928.

I claim:

1. The method of retarding the deterioration of rubber which comprises treating rubber with a poly-aryl carbinol containing at least one and not more than two amino-groups.

2. The method of retarding the deterioration of rubber which comprises treating rubber with a diamino diaryl carbinol.

3. The process of increasing the resistance of rubber to deterioration which comprises incorporating with the rubber a product having the following general formula

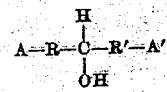

wherein A and A' represent amino groups or mono- or dialkyl amino groups, and R and R' represent arylene nuclei.

4. The process of increasing the resistance of rubber to deterioration which comprises incorporating with the rubber tetra-methyl-diamino-benzhydrol.

5. In the art of vulcanizing rubber, the step of mixing with the unvulcanized rubber a vulcanizing agent and a compound having the general formula $$A-R-\underset{\underset{OH}{|}}{\overset{\overset{H}{|}}{C}}-R'-A'$$

wherein A and A' represent amino groups or mono- or dialkyl amino groups, and R and R' represent arylene nuclei, and thereafter vulcanizing.

6. In the art of vulcanizing rubber, the step of mixing with the unvulcanized rubber a vulcanizing agent and a compound having the formula set forth in claim 3, in which formula at least one of A and A' represent an alkyl substituted amino group, and thereafter vulcanizing.

7. In the art of vulcanizing rubber, the step of mixing with the unvulcanized rubber a vulcanizing agent and a compound having the formula set forth in claim 3, in which formula at least one of A and A' represents a dialkyl substituted amino group, and thereafter vulcanizing.

8. In the art of vulcanizing rubber, the step of mixing with the unvulcanized rubber a vulcanizing agent and a compound having the formula set forth in claim 3, in which formula both A and A' represent an alkyl substituted amino group, and thereafter vulcanizing.

9. In the art of vulcanizing rubber, the step of mixing with the unvulcanized rubber a vulcanizing agent and a compound having the formula set forth in claim 3, in which formula both A and A' represent a dialkyl substituted amino group, and thereafter vulcanizing.

10. In the art of vulcanizing rubber, the step of mixing with the unvulcanized rubber a vulcanizing agent and a compound having a formula set forth in claim 3, in which formula both R and R' represent phenyl radicals, and thereafter vulcanizing.

11. In the art of vulcanizing rubber, the step of mixing with the unvulcanized rubber a vulcanizing agent and a compound having the formula set forth in claim 3, in which formula both A and A' represent alkyl substituted amino groups, and both R and R' represent phenyl groups, and thereafter vulcanizing.

12. In the art of vulcanizing rubber, the step of mixing with the unvulcanized rubber a vulcanizing agent and tetra-methyl-diamino-benzhydrol, and thereafter vulcanizing.

13. The method of preserving rubber which comprises treating rubber with a compound having the general formula $$A-R-X-R'-A'$$

wherein R and R' represent arylene groups, A and A' represent amino groups and X represents a carbinol group, and in which any of the groups may contain hydrocarbon substituents, but no other substituents.

14. The method of preserving rubber which comprises treating rubber with a compound having the general formula $$A-R-X-R'-A'$$

wherein R and R' represent aromatic hydrocarbon nuclei selected from the benzene series, A and A' represent amino groups, and X represents a carbinol group, and in which at least one of the groups A, A' and X contains a hydrocarbon substituent, but which contains no other substituents.

15. The method of preserving rubber which comprises treating rubber with a substance having the general formula $$A-R-X-R'-A'$$

wherein R and R' represent aromatic nuclei, X represents a carbinol group, and A and A' represent arylamino groups.

16. The method of preserving rubber which comprises treating rubber with p, p' di(naphthylamino) diphenyl carbinol.

17. A composition comprising rubber and poly-aryl carbinol containing at least one and not more than two amino groups.

18. A composition comprising rubber and a diamino diaryl carbinol.

19. Rubber having incorporated therewith an anti-aging compound having the general formula $$A-R-\underset{\underset{OH}{|}}{\overset{\overset{H}{|}}{C}}-R'-A'$$

wherein A and A' represent amino groups or mono- or diakyl amino groups, and R and R' represent arylene nuclei.

20. Rubber having incorporated therewith tetra-methyl-diamino-benzhydrol.

21. Vulcanized rubber obtained by incorporating therewith a vulcanizing agent and an antiaging compound having the general formula $$A-R-\underset{\underset{OH}{|}}{\overset{\overset{H}{|}}{C}}-R'-A'$$

wherein both A and A' represent an alkyl substituted amino group, and R and R' represent arylene radicals, and thereafter vulcanizing.

22. Vulcanized rubber obtained by incorporating therewith a vulcanizing agent and an antiaging compound having the general formula.

$$A-R-\underset{\underset{OH}{|}}{\overset{\overset{H}{|}}{C}}-R'-A'$$

wherein both A and A' represent a dialkyl substituted amino group, and R and R' represent phenylene radicals, and thereafter vulcanizing.

23. Vulcanized rubber obtained by incorporating with the rubber prior to vulcanization from 1 to 5% of tetra-methyl-diamino-benzhydrol and a vulcanizing agent, and thereafter vulcanizing.

24. In the art of vulcanizing rubber, the step of mixing with the unvulcanized rubber a vulcanizing agent and p, p'-diamino-benzhydrol, and thereafter vulcanizing.

25. Vulcanized rubber obtained by incorporating with the rubber prior to vulcanizing from 1 to 5% of p, p'-diamino-benzhydrol.

26. A composition comprising rubber and a compound having the general formula

A—R—X—R'—A' wherein R and R' represent arylene groups, A and A' represent amino groups and X represents a carbinol group, and in which any of the groups may contain hydrocarbon substituents, but no other substituents.

27. A composition comprising rubber and a compound having the general formula

A—R—X—R'—A' wherein R and R' represent aromatic hydrocarbon nuclei selected from the benzene series, A and A' represent amino groups, and X represents a carbinol group, and in which at least one of the groups A, A' and X contains a hydrocarbon substituent, but which contains no other substituents.

28. A composition comprising rubber and a substance having the general formula

A—R—X—R'—A' wherein R and R' represent aromatic nuclei, X represents a carbinol group, and A and A' represent arylamino groups.

29. A composition comprising rubber and p, p' di(naphthylamino) diphenyl carbinol.

ARTHUR W. SLOAN.